United States Patent
Wahl et al.

(10) Patent No.: US 10,528,549 B2
(45) Date of Patent: Jan. 7, 2020

(54) SYSTEMS AND METHODS FOR USE IN LOADING DATA BASED ON A HIERARCHICAL FRAMEWORK

(71) Applicant: MASTERCARD INTERNATIONAL INCORPORATED, Purchase, NY (US)

(72) Inventors: Matthew Stephen Wahl, Cottleville, MO (US); Tristan C. Hanson, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 176 days.

(21) Appl. No.: 15/714,675

(22) Filed: Sep. 25, 2017

(65) Prior Publication Data

US 2019/0095476 A1 Mar. 28, 2019

(51) Int. Cl.
- *G06F 9/44* (2018.01)
- *G06F 16/23* (2019.01)
- *G06F 11/36* (2006.01)
- *G06F 16/901* (2019.01)

(52) U.S. Cl.
CPC ...... *G06F 16/2365* (2019.01); *G06F 11/3688* (2013.01); *G06F 16/9024* (2019.01)

(58) Field of Classification Search
CPC .......... G06F 16/9024; G06F 11/3688
USPC .......................................... 717/124
See application file for complete search history.

(56) References Cited

U.S. PATENT DOCUMENTS

| | | | | |
|---|---|---|---|---|
| 6,411,961 | B1* | 6/2002 | Chen | G06F 16/30 |
| 6,473,794 | B1* | 10/2002 | Guheen | H04L 41/22 |
| | | | | 709/223 |
| 6,862,711 | B1* | 3/2005 | Bahrs | G06F 8/38 |
| | | | | 715/205 |
| 6,886,170 | B1* | 4/2005 | Bahrs | G06F 8/24 |
| | | | | 715/760 |
| 6,944,830 | B2* | 9/2005 | Card | G06F 16/954 |
| | | | | 715/853 |
| 7,392,488 | B2* | 6/2008 | Card | G06F 16/954 |
| | | | | 715/853 |

(Continued)

OTHER PUBLICATIONS

"A Comparative Study between ETL (Extract-Transform-Load) and E-LT (Extract-Load-Transform) approach for loading data into a Data Warehouse"; Vikas Ranjan—Computer Science at California State University, Chico, CA ; Dec. 17, 2009.*

*Primary Examiner* — Francisco J Aponte
(74) *Attorney, Agent, or Firm* — Harness, Dickey & Pierce, P.L.C.

(57) ABSTRACT

Systems and methods are provided for loading data based on a data hierarchical framework for an entity. An exemplary method includes, for a data load related to the entity, determining whether a data loader associated with a root node requires action. And, when the data loader associated with the root node requires action, the method includes identifying a first dependency of the data loader associated with the root node of the hierarchical framework on another data loader associated with another node of the hierarchical framework, and executing the another data loader and then executing the data loader associated with the root node, whereby data is loaded to the data structure consistent with the data hierarchical framework.

13 Claims, 4 Drawing Sheets

(56) References Cited

U.S. PATENT DOCUMENTS

| | | | | |
|---|---|---|---|---|
| 7,853,930 | B2* | 12/2010 | Mitchell | G06F 12/0253 |
| | | | | 717/124 |
| 7,954,096 | B2* | 5/2011 | Atsatt | G06F 9/44536 |
| | | | | 717/148 |
| 8,502,823 | B2* | 8/2013 | Moreno | G06T 11/206 |
| | | | | 345/440 |
| 8,892,638 | B2* | 11/2014 | Chang | G06F 9/54 |
| | | | | 709/203 |
| 8,978,010 | B1* | 3/2015 | Thumfart | G06F 8/433 |
| | | | | 717/123 |
| 2008/0168082 | A1* | 7/2008 | Jin | G06F 8/20 |
| 2014/0114926 | A1* | 4/2014 | Anderson | G06F 16/24544 |
| | | | | 707/687 |
| 2014/0344625 | A1* | 11/2014 | Thatte | G06F 11/3636 |
| | | | | 714/38.1 |
| 2015/0081832 | A1* | 3/2015 | Handa | G06F 15/167 |
| | | | | 709/213 |
| 2015/0370871 | A1* | 12/2015 | Bender | G06F 16/254 |
| | | | | 707/602 |
| 2016/0048542 | A1* | 2/2016 | Gluzman Peregrine | |
| | | | | G06F 16/215 |
| | | | | 707/692 |
| 2019/0163686 | A1* | 5/2019 | Liu | G06F 16/00 |

* cited by examiner

SYSTEMS AND METHODS FOR USE IN LOADING DATA BASED ON A HIERARCHICAL FRAMEWORK

FIELD

The present disclosure generally relates to systems and methods for use in loading data, based on a hierarchical framework, in connection with at least testing of various different applications and/or data seeding into production environments, etc.

BACKGROUND

This section provides background information related to the present disclosure which is not necessarily prior art.

Data is used in various different environments, where the data is the subject of different operations, especially in the context of application testing. Access and/or availability of data to the applications is known to be defined by one or more programmers and/or users associated with the data, whereby scripts are written, for example, in native languages, to load the data into a data structure for use by the applications (e.g., for testing of the applications, etc.). SQL (Structured Query Language) scripts, for example, are known to be used to load data into integration test environments. The SQL scripts will generally be written by a programmer to be specific to the particular data load requested and/or the application under test, and, as such, includes the specific parameters of the data load. Once written for the specific data to be loaded, the script is compiled and run to load the data as desired. When the SQL script includes one or more errors and/or issues, the SQL script generally halts and/or errors during execution. Subsequently, the programmer revisits the SQL script to edit and/or correct the issues and/or errors prior to recompiling and re-executing the same.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Applications and services often rely on data included in data structures to perform operations, including, for example, payment account-related operations (e.g., fraud detection, analytics, etc.), etc. The data is accessed, by the applications and/or services, through one or more of the operations. Uniquely, the systems and methods herein permit efficient data loading based on a hierarchical framework of domain objects. In particular, in connection with financial transactions, for example, data is defined in different layers of a hierarchical framework, which is representative of a hierarchy of a banking institution, etc. For each layer of the framework, a data loader (or domain object) is provided, which, as appropriate, includes one or more hierarchical dependencies (or no dependencies) to one or more other data loaders. When the data is to be loaded to provide a dataset for reference by an application under test, for example, the data loaders are evaluated to determine the hierarchy of the hierarchical framework and then executed, consistent with the hierarchy, to load the data to a data structure for use by the application. Further, in various embodiments, the data loaders may include logic for also cleaning data from the data structure, whereby the data loaders are executed, in reverse order, for example, to clean the data from the data structure. In this manner, domain objects are used to provide an efficient loading (and cleaning) of data in connection with the application (in testing or otherwise), whereby the application is permitted to execute business logic or other logic on the data loaded. The data loaders (or domain objects) may be reused efficiently in other frameworks to load the same, or other different data. And, by use of the domain objects, the framework is further suited to provide compile-time feedback (as compared to execution-time feedback), which generally provides efficient identification and/or resolution of issues and/or errors in the framework (or, specifically, the domain objects).

Figure 1:
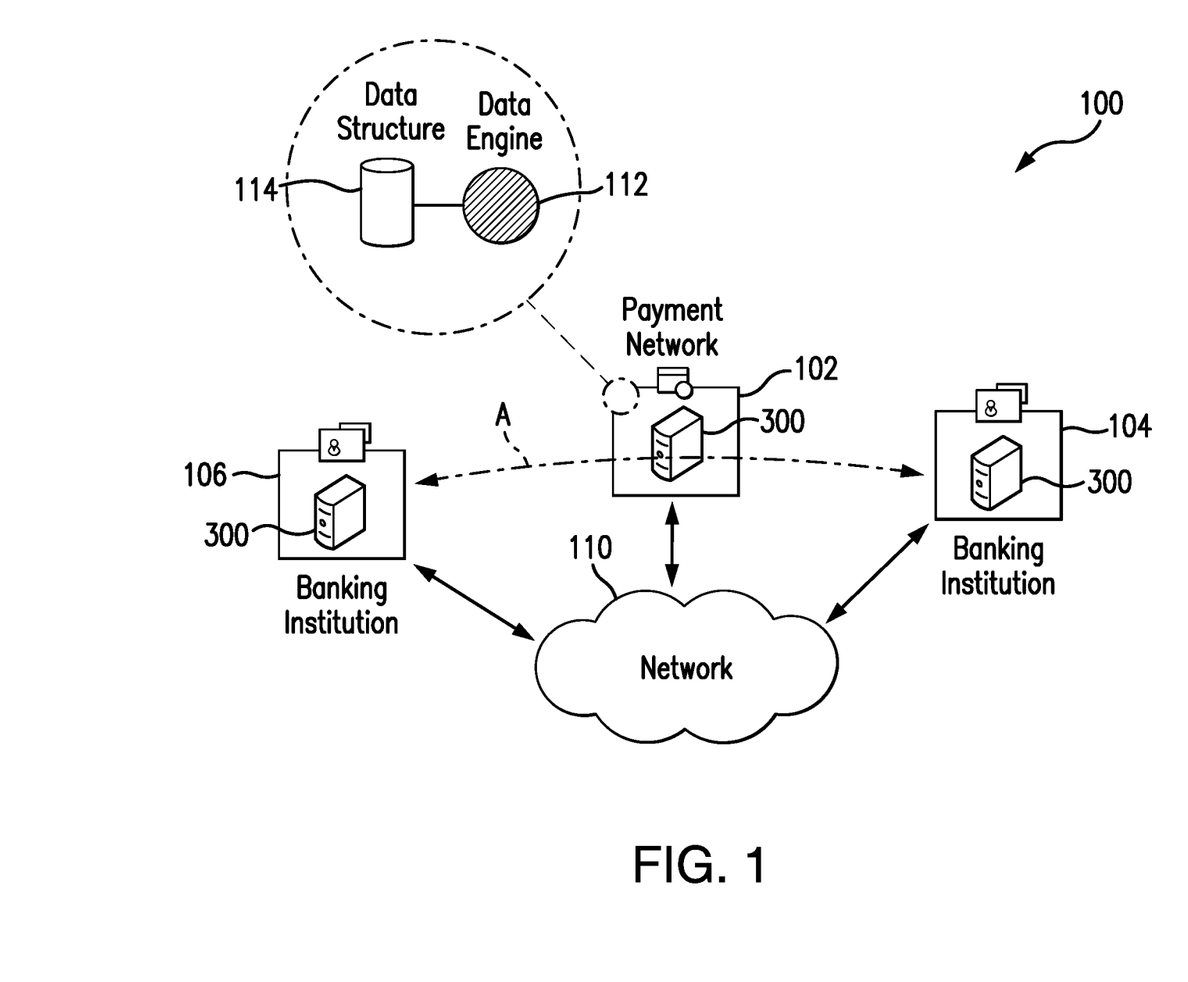
FIG. 1 illustrates an exemplary system for loading data based on a hierarchical framework, and including one or more aspects of the present disclosure.

FIG. 1 illustrates an exemplary system 100, in which one or more aspects of the present disclosure may be implemented. Although parts of the system 100 are presented in one arrangement, other embodiments may include the same or different parts arranged otherwise, depending, for example, on applications and/or services involved therein, etc.

The illustrated system 100 generally includes a payment network 102 and banking institutions 104 and 106, each coupled to network 110. The network 110 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or even combinations thereof. In one example, the network 110 includes multiple networks, where different ones of the multiple networks are accessible to different ones of the illustrated components in FIG. 1. In this example, the payment network 102 and the banking institution 104 may be connected via a private network for processing purchase transactions, and various merchants (not shown) and the banking institution 106 may be connected through a public network, such as the Internet.

Generally in the system 100, the banking institutions 104 and 106 provide services related to banking, lending, investment, etc., whereby each provides accounts, such as, for example, checking accounts, savings accounts, investment accounts, payment accounts, etc. Both of the banking institutions 104 and 106 comprise a hierarchical framework of data associated with the different accounts provided thereby.

Figure 2:
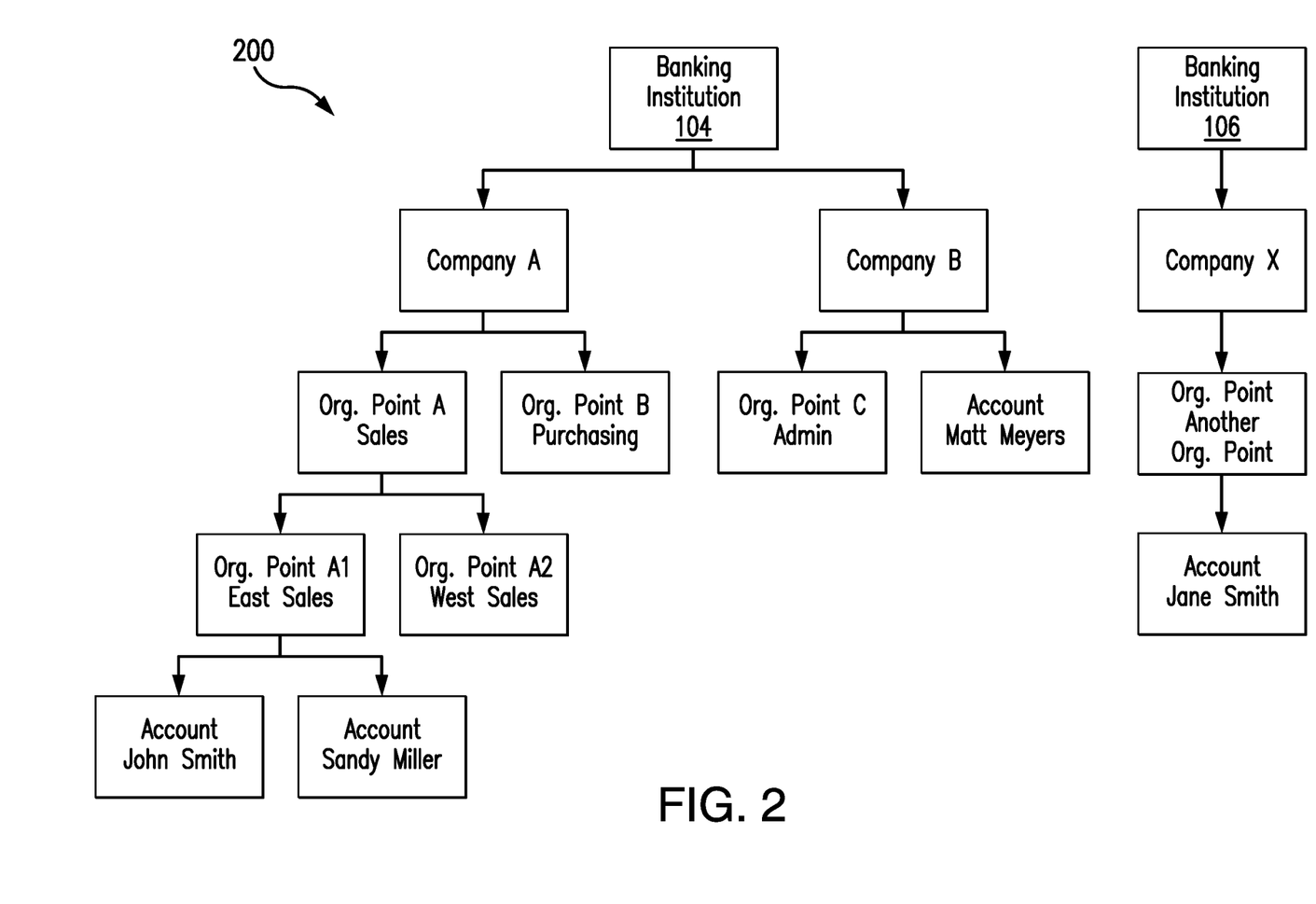
FIG. 2 is a block diagram of a hierarchical framework of multiple banking institutions as included in FIG. 1.

An exemplary segment of an account hierarchy for each of the banking institutions 104 and 106 is included in FIG. 2 and referenced generally 200. The hierarchy 200 is described in detail below, but in general provides a hierarchy (a hierarchical framework consisting of nodes) for storing and/or loading data in and/or from a data structure 114 and associated with various companies, organization points, accounts, etc. of the banking institutions 104 and 106. With that said, as shown in FIG. 2, the banking institution 104 includes a top layer in which the banking institution 104 (generally, a node) distinguishes issued accounts by company (i.e., Company A and Company B), layers where the banking institution 104 distinguishes issued accounts by organization points (and sub-points) (i.e., Org. Point A—Sales, Org. Point B—Purchasing, Org. Point C—Admin, Org. Point A1—East Sales, and Org. Point A2—West Sales) and which are different nodes, and a layer that distinguishes issued accounts by person and/or consumer (i.e., John Smith and Sandy Miller, and Matt Meyers) and which are different nodes. As such, the hierarchical framework includes multiple nodes. Likewise, the banking institution 106 includes a top layer in which the banking institution 106 distinguishes issued accounts by company (i.e., Company X), a layer where the banking institution 104 distinguishes issued accounts by organization points (i.e., Org. Point—Another Org. Point), and a layer that distinguishes issued accounts by person and/or consumer (i.e., Jane Smith), whereby the hierarchical framework again includes multiple nodes. As such, from the example shown in FIG. 2, it should be apparent that the hierarchy may be constructed in different depths and/or layers, for example, where each node in the hierarchy is generally only linked to and/or concerned with a node to which it reports data.

It should further be appreciated that the hierarchy 200 illustrated in FIG. 2, as associated with the banking institutions 104 and/or 106 or other banking institutions, may be otherwise in other embodiments. That is, for example, the hierarchy 200 may include a different number and/or organization of layers and/or a different number of divisions within the layers, than shown in FIG. 2. Broadly, the hierarchy 200 will be based on the specific account mix and/or distribution by the entities and/or persons to which accounts are issued by the particular banking institutions 104 and 106. And, the hierarchy 200 is not necessarily limited and/or constricted to the inclusion of consistent data at each layer.

While the system 100 is described with reference to the banking institutions 104 and 106, and transaction data, as describe below, other system embodiments may be directed to other types of entities and/or data, such that the present disclosure should not be understood to be limited to banking institutions, financial transactions, and/or transaction data.

Referring again to FIG. 1, each of the banking institutions 104 and 106 further permits and/or provides for transactions between accounts, which may be included in the banking institutions 104 and 106 or in other banking institutions (also included in the system 100 or otherwise). For example, a payment account transaction between a credit account issued by the banking institution 104 and an account associated with a merchant (not shown) and issued by the banking institution 106 will generally involve the exchange of authorization messages, for example, along path A in FIG. 1, followed by clearing and settlement by and between the banking institutions 104 and 106 to exchange funds, as coordinated by the payment network 102.

As part of such transactions involving the payment network 102, including the example transaction above, transaction data is generated, collected and stored as appropriate. The transaction data represents at least a plurality of transactions, e.g., completed transactions, attempted transactions, etc. within the system 100. The transaction data, in this exemplary embodiment, is stored at least by the payment network 102 (e.g., in the data structure 114 associated with the payment network 102, etc.). In connection therewith, the transaction data may include, for example, account numbers, merchant IDs (specific to the point-of-sale (POS) terminal within a merchant, for example), merchant addresses, amounts of transactions, merchant category codes, dates/times of transactions, consumer names, expiration dates, verification codes, etc. It should be appreciated that more or less information related to transactions, as part of either authorization and/or clearing and/or settling, may be included in transaction data and stored within the system 100. Further, transaction data, unrelated to a particular account, may be collected by a variety of techniques, and similarly stored in the data structure 114 within the system 100.

The transaction data is generally stored and identified, in the payment network 102, consistent with the hierarchical framework illustrated in FIG. 2.

In various exemplary embodiments, the banking institutions 104 and 106 and consumers (not shown) involved in different transactions herein (e.g., in purchase transactions at merchants in the system 100 through use of payment accounts issued by the banking institutions 104 and 106, etc.), are prompted to agree to legal terms associated with interactions with the payment network 102, their payment accounts, etc., for example, during onboarding, enrollment, etc. In so doing, the banking institutions 104 and 106 and/or the consumers may voluntarily agree, for example, to allow others (e.g., the payment network 102, etc.), to use data collected during enrollment and/or collected in connection with processing the transactions, subsequently, for one or more of the different purposes described herein.

While only one payment network 102 and two banking institutions 104 and 106 are illustrated in the system 100 in FIG. 1 (for ease of reference), it should be appreciated that the system 100, and/or a variety of other embodiments, may include multiple ones of one or more of these parts in various combinations.

Figure 3:
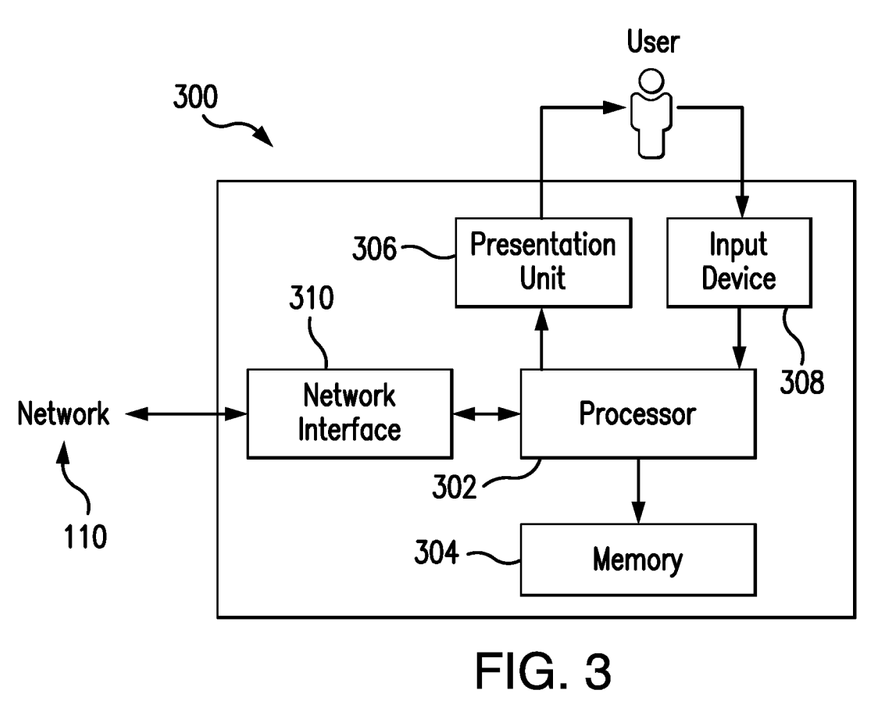
FIG. 3 is a block diagram of an exemplary computing device that may be used in the system of FIG. 1.

FIG. 3 illustrates an exemplary computing device 300 that can be used in the system 100. The computing device 300 may include, for example, one or more servers, workstations, personal computers, laptops, tablets, smartphones, other suitable computing devices, etc. In addition, the computing device 300 may include a single computing device, or it may include multiple computing devices located in close proximity, or multiple computing devices distributed over a geographic region, so long as the computing devices are specifically configured to function as described herein. In the exemplary embodiment of FIG. 1, each of the payment network 102 and the banking institutions 104 and 106 are illustrated as including, or being implemented in, computing device 300, coupled to the network 110. With that said, the system 100 should not be considered to be limited to the computing device 300, as described below, as different computing devices and/or arrangements of computing devices may be used. In addition, different components and/or arrangements of components may be used in other computing devices.

Referring to FIG. 3, the exemplary computing device 300 as specifically configured herein, includes a processor 302 and at least one memory 304 coupled to the processor 302. The processor 302 may include one or more processing units (e.g., in a multi-core configuration, etc.). For example, the processor 302 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. The memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 304 may also include one or more data structures, and may further be specifically configured to store, without limitation, transaction data, domain objects, account hierarchies, scripts, test classes, test environments, and/or other types of data suitable for use as described herein. Furthermore, in various embodiments, computer-executable instructions may be stored in the memory 304 for execution by the processor 302 to cause the processor 302 to perform one or more of the functions described herein, such that the memory 304 is a physical, tangible, and non-transitory computer readable storage media. It should be appreciated that the memory 304 may include a variety of different memories, each implemented in one or more of the functions or processes described herein.

In the exemplary embodiment, the unique computing device 300 includes a presentation unit 306 (or output device or display device) that is coupled to the processor 302 (however, it should be appreciated that the computing device 300 could include output devices other than the presentation unit 306, etc.). The presentation unit 306 outputs information, either visually or audibly, to a user of the computing device 300. The presentation unit 306 may include, without limitation, a liquid crystal display (LCD), a light-emitting diode (LED) display, an organic LED (OLED) display, an "electronic ink" display, etc. In some embodiments, presentation unit 306 includes multiple devices. Further, the computing device 300 includes an input device 308 that receives inputs from the user of the computing device 300 (i.e., user inputs). The input device 308 is coupled to the processor 302 and may include, for example, a keyboard, a pointing device, a mouse, a stylus, a touch sensitive panel (e.g., a touch pad or a touch screen, etc.), another computing device, and/or an audio input device. In various exemplary embodiments, a touch screen, such as that included in a tablet, a smartphone, or similar device, may behave as both a presentation unit and an input device.

In addition, the illustrated computing device 300 includes a network interface 310 coupled to the processor 302 and the memory 304. The network interface 310 may include, without limitation, a wired network adapter, a wireless network adapter, a mobile network adapter, or other device capable of communicating to one or more different networks, including the network 110. Further, in some exemplary embodiments, the computing device 300 includes the processor 302 and one or more network interfaces incorporated into or with the processor 302.

Referring again to FIG. 1, in the illustrated system 100, the payment network 102 includes a data engine 112, which is uniquely configured, by computer executable instructions, to perform one or more of the operations described herein.

In particular, the data engine 112 may be employed in connection with production applications and/or services, as in connection with testing of and/or migration to applications and/or services, data seeding to one or more production environments, etc. In the illustrated embodiment, the data engine 112 forms part of the payment network 102, as indicated by the dotted lines, and is in communication with the data structure 114. However, it should be appreciated that the data engine 112 may be separate and/or standalone in other embodiments. That said, the data engine 112 may be employed in other parts of the system 100, as desired or needed, to operate on data as described herein (e.g., the data engine 112 should not be considered bound to the payment network 102, etc.).

In the system 100, the data engine 112 is defined in multiple different code segments, including the various exemplary code segments provided herein, which are generally specific to the hierarchy 200 shown in FIG. 2. It should be appreciated, however, that different code segments and/or code included therein may be employed in other data engine embodiments and/or for different account hierarchies.

As an example, the following code segment may define the exemplary account layer data in the hierarchy 200 for the banking institution 104:

```
public class Account {
    private Long id;
    private String accountNumber;
    private String name;
    private Company company;
    private OrgPoint orgPoint;
    public Account(String accountNumber, String name, Company company, OrgPoint orgPoint) {
        this.accountNumber = accountNumber;
        this.name = name;
        this.company = company;
        this.orgPoint = orgPoint;
    }
    public String getAccountNumber( ) {
        return this.accountNumber;
    }
}
```

In addition, the following code segment may define the exemplary organizational point layer data in the hierarchy 200 for the banking institution 104:

```
public class OrgPoint {
    private Long id;
    private String name;
    private Company company;
    public OrgPoint(String name, Company company) {
        this.name = name;
        this.company = company;
    }
}
```

Further, the following code segment may define the exemplary company layer data in the hierarchy 200 for the banking institution 104:

```
public class Company {
    private Long id;
    private String name;
```

```
    private Issuer issuer;
    public Company(String name, Issuer issuer) {
        this.name = name;
        this.issuer = issuer;
    }
}
```

And, the following code segment may define the exemplary banking institution (or issuer) layer data in the hierarchy 200 for the banking institution 104:

```
public class Issuer {
    private Long id;
    private String name;
    public Issuer(String name) {
        this.name = name;
    }
}
```

In addition to the above, the data engine 112 includes a data loader for each of the layers of data within the hierarchy 200, which includes an object definition of the location of the respective data. The data loaders, in turn, configure the data engine 112 to load data from the respective sources, as described in more detail below. In this exemplary embodiment, each of the data loaders referenced herein (like the data definitions herein) includes a JAVA object, although one or more other types of objects written in other languages may be used in other embodiments.

As an example, the following code segment may define the exemplary data loader for account data of the banking institution 104 within the hierarchy 200:

```
@DataLoader(dependencies = {OrgPointDataLoader.class})
public class AccountDataLoader extends TestDataLoader<Account> {
    public AccountDataLoader(DataLoaderDependencyManager manager,
    AccountRepository repository) {
        super(manager, repository);
    }
    @Override
    protected List<Account> doLoad( ) {
        List<Company> companyList = (List<Company>)
        this.getDependentData(CompanyDataLoader.class);
        List<OrgPoint> orgPointList = (List<OrgPoint>)
        this.getDependentData(OrgPointDataLoader.class);
        Account joeSmith = new Account("0", "John Smith",
        companyList.getCompanyA( ), orgPointList.getEastSales( ));
        Account sandyMiller = new Account("0", "Sandy Miller",
        companyList.getCompanyA( ), orgPointList.getEastSales( ));
        Account mattMeyers = new Account("0", "Matt Meyers",
        companyList.getCompanyB( ), null);
        Account janeSmith = new Account("0", "Jane Smith",
        companyList.getCompanyX( ), orgPointList.getanotherOrgPoint( ));
        return repository.save(johnSmith, sandyMiller, mattMeyers,
        janeSmith);
    }
    @Override
    protected void doCleanup( ) {
        repository.deleteAll( );
    }
}
```

The following code segment may define the exemplary data loader for organization data of the banking institution 104 within the hierarchy 200:

```
@DataLoader(dependencies = {CompanyDataLoader.class})
public class OrgPointDataLoader extends TestDataLoader<OrgPoint> {
    public OrgPointDataLoader(DataLoaderDependencyManager manager,
    OrgPointRepository repository) {
        super(manager, repository);
    }
    @Override
    protected List<OrgPoint> doLoad( ) {
        List<Company> companyList = (List<Company>)
        this.getDependentData(CompanyDataLoader.class);
        OrgPoint sales = new OrgPoint("Sales", companyList.getCompanyA ( ));
        OrgPoint eastSales = new OrgPoint("East Sales", companyList.getCompanyA( ));
        OrgPoint westSales = new OrgPoint("West Sales", companyList.getCompanyA( ));
        OrgPoint purchasing = new OrgPoint("Purchasing", companyList.getCompanyA( ));
        OrgPoint admin = new OrgPoint("Admin", companyList.getCompanyB( ));
        OrgPoint anotherOrgPoint = new OrgPoint("Another Org Point",
        companyList.getCompanyX( ));
        return repository.save(sales, eastSales, westSales, purchasing, admin, anotherOrgPoint);
    }
    @Override
    protected void doCleanup( ) {
        repository.deleteAll( );
    }
}
```

Further, the following code segment may define the exemplary data loader for company data of the banking institution 104 within the hierarchy 200:

```
@DataLoader(dependencies = {IssuerDataLoader.class})
public class CompanyDataLoader extends TestDataLoader<Company> {
public CompanyDataLoader(DataLoaderDependencyManager manager,
CompanyRepository repository) {
    super(manager, repository);
}
@Override
protected List<Company> doLoad( ) {
    List<Issuer> issuerList = (List<Issuer>)
    this.getDependentData(IssuerDataLoader.class);
    Company companyA = new Company("Company A",
    issuerList.getBankingInstitution104( ));
    Company companyB = new Company("Company B",
    issuerList.getBankingInstitution104 ( ));
    Company companyX = new Company("Company X", issuerList.get
    BankingInstitution106( ));
    return repository.save(Company A, Company B, Company X);
}
@Override
protected void doCleanup( ) {
    repository.deleteAll( );
    }
}
```

And, the following code segment may define the exemplary data loader for banking institution (or issuer) data of the banking institution 104 within the hierarchy 200:

```
@DataLoader
public class IssuerDataLoader extends TestDataLoader<Issuer> {
    public IssuerDataLoader(DataLoaderDependencyManager manager,
IssuerRepository repository) {
    super(manager, repository);
}
@Override
protected List<Issuer> doLoad( ) {
    Issuer bankinginstitution104 = new Issuer("Banking Institution 104");
        Issuer bankinginstitution106 = new Issuer("Banking
Institution 106");
    return repository.save(BankingInstitution104, BankingInstitution106);
}
@Override
protected void doCleanup( ) {
    repository.deleteAll( );
    }
}
```

With that said, by the above, the data engine 112 is configured to load data, when requested, to the hierarchy 200 defined therein.

Specifically, for example, a user may desire to execute a test application, which is reliant on data at multiple layers of the hierarchy 200 of FIG. 2. To do so, the user initiates the test application (e.g., by one or more user inputs to input device 308, etc.). From there, in this exemplary embodiment, the data engine 112 is configured to create a Spring bean for the test application and to determine if the Spring bean is and/or includes a data loader, such as one of the data loaders outlined above. When the data loader is identified, the data engine 112 is configured to determine if the data loader includes any dependency.

If the data loader includes a dependency, the data engine 112 is configured to add the dependency to a dependency graph, for example, as shown in the right of FIG. 2 (for the banking institution 106 for example). After each dependency is identified and added to the dependency graph, the data engine 112 is configured to start a test context and to determine if data should be loaded before executing the test application. In connection therewith, if the data engine 112 determines that data should be loaded, the data engine 112 is configured to determine if the corresponding data loader requires action. And, when the data loader does require action, the data engine 112 is configured to then execute the data loader code segment to thereby load data into or from the data structure 114. The data engine 112 is configured to then move on to the next data loader and to load the data, by execution of the data loader, etc. Finally, once all of the data loaders and the dependencies are executed, the data engine 112 is configured to execute the test application.

Then in this example, once the test is complete, the data engine 112 is configured to clean up the data, by revisiting each of the data loaders executed in loading the data, but in a reverse order, whereby the data engine 112 is configured to execute the data loader cleanup logic, as included above. Once cleaned, the data engine 112 is permitted to proceed to a next application, or test application, etc.

While the system 100 is described in connection with a test application at the payment network 102, it should be appreciated that the system 100 may be used in connection with other services and/or applications (e.g., data seeding, etc.) for use in the payment network 102, for use in one or more of the banking institutions 104 and 106, or for use in another entity associated therewith.

Figure 4:
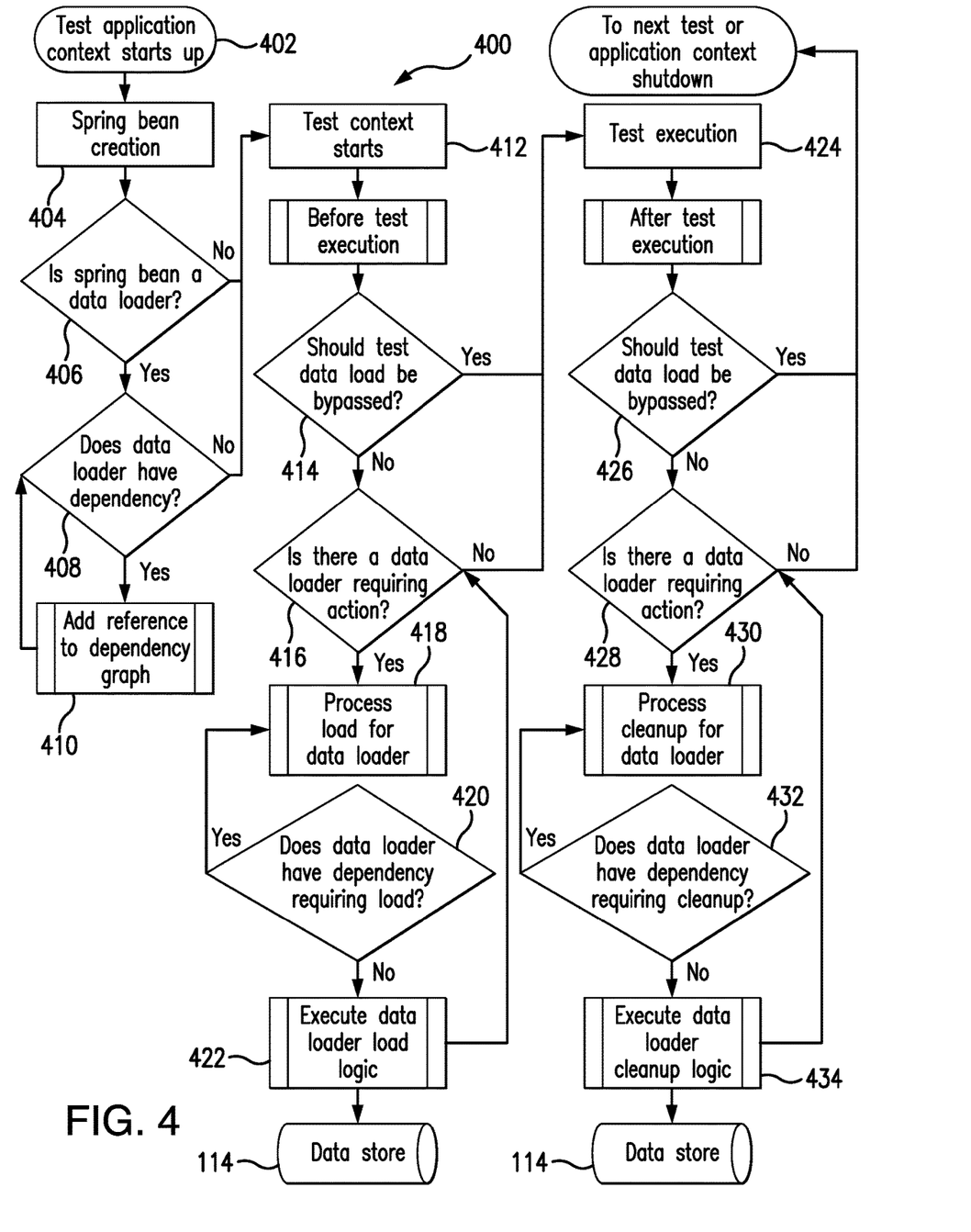
FIG. 4 is an exemplary method associated with a test workflow for an application, which includes data loading and cleaning based on the hierarchical framework of FIG. 2 and which can be implemented via the system of FIG. 1.

FIG. 4 illustrates an exemplary method 400 for loading data, based on a hierarchical framework, in connection with testing an application. The exemplary method 400 is described as implemented in the payment network 102 of the system 100, and in particular, in the data engine 112. However, the method 400 is not limited to the payment network 102, and, as such, may be implemented in other parts of the system 100 in other embodiments, or in other systems. As should be understood, however, that the methods herein are not limited to the exemplary system 100 or the exemplary computing device 300, and the systems and the computing devices herein are not limited to the exemplary method 400.

In addition, the method 400 is described herein with reference to execution of a test application, which is dependent on the data included in the hierarchy 200 of FIG. 2. But again, as should be appreciated, the method 400 may be applicable to other applications and/or services, and/or may be dependent on other hierarchical frameworks and/or data therein in other embodiments.

At 402 in the method 400, the test application context is started by the data engine 112. Thereafter, an object is created by the data engine 112, at 404, which, in this embodiment, includes a Spring bean, but may be otherwise in other embodiments. As used herein, the Spring Bean includes an object that is typically a singleton (i.e., one instance per application) and that may include a single responsibility to perform some task. The object then includes, in this example for the test application, the data loader for the account layer data in the hierarchical framework 200 shown in FIG. 2. More specifically, the data engine 112 determines the data to be loaded based on at least one annotation of the test class of the test application, where the annotation includes a pointer to the data loader (for the account layer) to run the tests (i.e., and defined by the test class).

At 406, the data engine 112 then determines whether the object includes a data loader, which in this example it does, i.e., the account data loader and the other data loaders as defined above. In particular, when the test class is written, the developer provides a list of data loaders necessary to satisfy the test requirements. The list of data loaders, however, is not required to have a particular order of precedence, as the data engine 112 (as described below) navigates from the root node of hierarchical framework (i.e., the root node data loader) to each intermediate node (and associated data loader) and then traverses back to the root node (i.e., the root node data loader). Each intermediate node will have dependencies included therein satisfied in the same way until the originating node is reached. Then, if other data loader(s) are specified on the test class, each will have their dependencies satisfied starting at their root node (which is often the same root node)—assuming that each has not already been processed from a previously satisfied data loader. However, when the object does not include a data loader, at 406, the data engine 112 starts the text context, at 412 (as described in more detail below).

Next, when the data engine 112 determines, at 406, that the object includes a data loader, the data engine 112 determines, at 408, whether the data loader includes any dependencies and identifies those dependencies. When such dependencies are identified, the data engine 112 then references the identified dependencies in a corresponding dependency graph (e.g., the hierarchy 200 as shown in FIG. 2, etc.). Then, when no further dependencies are identified, the data engine 112 starts the text context, at 412.

For example, with reference to the code segments above, the data loader for the account layer data includes a dependency identifier, which indicates that the account layer data loader is dependent on the organization point data loader (e.g., dependencies={OrgPointDataLoader.class}, etc.). Accordingly, when such a dependency is identified, at 408, the data engine 112 reads the reference to the organization point data loader from the data loader and adds it into a corresponding dependency graph, at 410, and then returns to determine, at 408, if the data loader for the organization point includes any dependencies. Again, the code segment above for the data loader for the organization point data layer includes a dependency identifier, which identifies the company layer data loader (e.g., dependencies={CompanyDataLoader.class}, etc.). In turn, the data engine 112 reads the reference to the company data loader from the data loader and adds it into the dependency graph, at 410, and then returns again to determine if the data loader for the company includes any dependencies, at 408. Further, the code segment above for the data loader for the company data layer includes a dependency identifier, which identifies the issuer (or banking institution 104) data loader (e.g., dependencies={IssuerDataLoader.class }, etc.). And again, the data engine 112 reads the reference to the issuer data loader from the data loader and adds it into the dependency graph, at 410, and then returns again to determine, at 408, if the issuer data loader includes any dependencies. Then in this example, based on the code segment for the issuer data loader, the data engine 112 determines that there are no further dependencies and starts the text context, at 412. In general, in the above example, the data engine 112 has worked from the branch data loader, i.e., the account data loader back to the root data loader, i.e., the issuer data loader, for the data load specified for the test application.

With continued reference to FIG. 4, once the test context is started, but prior to test execution, the data engine 112 determines whether the data loader(s) should be executed, or bypassed, at 414. Specifically, for example, the test application may not rely on data to execute business logic. For this and other such applications, an annotation may be included for the class under test or for the specific test individually, to bypass the loading of test data. In connection therewith, when the data engine 112 identifies the annotation, at 414, it determines to bypass the data load and the method 400 exits to test execution, at 424. The bypass annotation may be included on the individual test class of the test application being executed, for example (e.g. when suitable data is already loaded, or to simulate some application state (e.g., where no accounts are loaded under a organization point for s specific test scenario, etc.), or otherwise, etc.).

Conversely in the method 400, when the data engine 112 determines, at 414, to not bypass the data loader(s) (e.g., no annotation is present in the class under test, or an annotation indicating not to bypass, etc.), the data engine 112 then determines, at 416, whether there is a data loader that requires action. The data engine 112 then proceeds to the process for loading data, at 418, by determining, at 420, whether the data loader has any dependencies associated therewith also requiring load (i.e., requiring action), thereby, for example, creating an execution order of the data loaders (e.g., from the root node to the leaf nodes, etc.). In particular, the data engine 112 determines whether the data loader being processed is the root node of its tree. If it is the root node (i.e., there is no data set that it depends on), the data engine 112 asks the data loader to create the data objects and provide them back to the data engine 112 for persisting to the data store (e.g., the data structure 114). Conversely, if the data loader has a dependency then the same logic is executed, by the data engine 112, on the parent until a root node is found. That is, when such dependencies are identified, the data engine 112 repeats operations 418 and 420. Upon determining a last dependency (i.e., that no further action is required, at 420), the data engine 112 executes the data loader(s), at 422, in succession (or in order based on the determined dependencies), whereby the data is loaded or persisted to the data store (e.g., the data structure 114, etc.) for each of the individual data loaders. The data engine 112 then confirms that no further data loaders require action, at 416, and executes the test application, at 424.

In the above example, described with reference to FIG. 2 (from banking institution 106), the account data loader may be determined to require action, at 416. In connection therewith, the data engine 112 proceeds to the process for loading data, at 418, by determining, at 420, whether the account data loader (for Jane Smith) has any dependencies requiring load. Again, the account data loader is determined to be dependent on the organization point data loader (for Another Org. Point), which is dependent on the company data loader (for Company X). And, the company data loader is determined to be dependent on the issuer data loader (for banking institution 106), which includes no further dependencies, each of which is determined according to, and/or based on, the annotations to the data loaders which specified the dependencies, as illustrated in FIG. 2. As described above, in the context of FIG. 4, upon determining this last dependency, the data engine 112 determines, at 420, that no further dependencies exist. Thereafter, the identified data loaders are executed, at 422, by the data engine 112, in succession (or in order based on the determined dependencies) whereby the data is loaded to the data structure 114. The data engine 112, in turn, determines, at 416, that no further data loaders require action and then execute the corresponding test application, at 424.

With further reference to FIG. 4, after executing the test application, at 424, the data engine 112 determines, at 426, if the test data load should be bypassed. The test data load may be bypassed because it may be, for example, less work to test against the data store, which would reduce the amount of processing time (whereby the data engine 112 proceeds with a next test (or with an application context shutdown)). When the data engine 112 determines that the data load should not be bypassed, the data engine 112 determines, at 428, whether there is a data loader associated therewith that requires action. In particular, when a data loader is used in connection with loading data (as part of the test data load), prior to execution of the test application, it will also be used, in this exemplary embodiment, to clean up the data after execution of the application, specifically here, where the data loader includes code directed to the cleanup or deletion of data after the test execution. In the above example, the data engine 112 may determine, at 428, that the issuer data loader requires action and proceed. Specifically, the data engine 112 tracks the data loaders that have been processed. In this manner, the data engine 112 is also able to track if cleanup is necessary on a data loader, or if it has already been cleaned.

As such, when a data loader is identified as requiring action, the data engine 112 proceeds to the cleanup process for the data loader, at 430, by determining, at 432, whether the data loader has any dependencies (i.e., reverse dependencies) (e.g., from the leaf nodes to the root node, etc.). Specifically, for the data loader, the data engine 112 builds the objects of the hierarchical framework. After that, the framework uses the repository provided by the annotation on the data loader to persist to the underlying data store in the data structure 114. When such dependencies are identified, the data engine 112 repeats operations 430 and 432. Upon determining a last dependency for cleaning (i.e., that the data loader has no further reverse dependencies requiring cleanup (i.e., the root node), at 432), the data engine 112 executes the data loader(s), at 434, again in succession (or in order based on the determined dependencies), whereby the data is cleaned up (or deleted) in the data structure 114. The data engine 112 then confirms that no further data loaders require action, at 428, and proceeds with a next test (or with an application context shutdown).

In the above example, the issuer data loader again is determined, at 432, to be dependent on the company data loader (and requiring cleanup), which is dependent on the organization point data loader. And, the organization point data loader is determined, at 432, to be dependent on the account data loader, which includes no further dependencies. As is apparent, for cleanup, the data loaders are understood to have dependencies that flow in the opposite direction, as compared to what was used in connection with loading data. Upon determining this last dependency, the data engine 112 determines, at 432, that no further dependencies exist. Thereafter, the data loaders are executed, at 434, by the data engine 112, in succession, for example, whereby the data is cleaned up (or deleted) in the data structure 114.

In view of the above, the systems and methods herein provide an efficient manner of loading data to a test environment, or other environment, by use of a hierarchical framework which is defined by data loader objects having interdependencies. The data loaders provide a segregated definition of the data to be loaded during testing of applications, whereby interdependencies of the data loaders are verified and/or error checked as compiled, rather than at execution, thereby providing a more efficient and shorter feedback loop to the programmers and/or users relying on the data loader(s), and ultimately more reliable and dependable applications. What's more, the data loaders, as separate objects, are more readily re-used in additional frameworks involving the same or different data, thereby potentially reducing the boilerplate work, and thus reducing the amount of time to create and maintain the data. Further, by providing compile-time feedback, it will also reduce the amount of time one or more developers spend playing with the code, as any changes done to the domain object will immediately be reflected when compiling the program. In addition, by specifying the hierarchical framework of the data without the need to put it into a specific order in a specific script, the above allows the developers to chain a series of datasets together, use them with confidence that the data will be loaded, and then dispose of them in the proper order. As can be appreciated, this can reduce the amount of time it takes, for example, to triage any sort of data conditions that could be the result of the primary key changing due to the order of data loaded being changed (in the case of relational databases).

One alternative to the developer of data loaders herein, for example, is a SQL language script (or another suitable language) to load data, which is shown in the exemplary code lines below and related to the above example.

INSERT INTO ISSUER (ISSUER_ID, ISSUER_NAME) VALUES (1, 'Banking Institution');
INSERT INTO COMPANY (COMPANY_ID, ISS_ID, COMPANY_NAME) VALUES (1, 1, 'Company A');
INSERT INTO ORG_POINT (ORG_POINT_ID, COMPANY_ID, ORG_NAME) VALUES (1, 1, 'Sales');
INSERT INTO ACCOUNT (ACCOUNT_ID, COMPANY_ID, ORG_ID, ACCT_NAME, ACCT_NUMBER) VALUES (1, 1, 2, 'John Smith', 0);

As apparent to those skilled in the art, the above SQL script is specific to the data and includes the logic in the script rather than providing for separate data layers in separate scripts. The developer may then be required to use multiple development languages, or context-switch between technologies when adding/maintaining the test data (which are not necessary in the systems and methods described herein). As such, the SQL script is potentially more susceptible to errors than the data loaders herein, which, for exe SQL script, may not be apparent until execution of the script, rather than as compiled, like in the above described methods and systems.

Further, the above systems and methods may provide added efficiencies in testing applications, data seeding to production environments, etc., which are to be provided as services (e.g., micro-services, etc.) and/or cloud-native applications, etc.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) prior to execution of an application, building, by a computing device, a dependency graph for multiple data loaders associated with the application and based on the multiple data loaders; (b) determining, by the computing device, whether one of the multiple data loaders associated with the application requires action; (c) determining, by the computing device, at least one dependency of the one of the multiple data loaders on at least one other one of the multiple data loaders requiring loading, based on the dependency graph, when the one of the multiple data loaders requires action; and (d) executing the multiple data loaders, in an order defined by the at least one dependency, whereby data is loaded to a data structure for use by the application.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in loading data, the system comprising:
    at least one memory including a data structure and a data hierarchical framework associated with an entity, the framework having multiple nodes each associated with a data loader, the multiple nodes including a root node; and
    at least one computing device coupled to the at least one memory, the at least one computing device configured, by executable instructions associated with a test context for an application and stored in the at least one memory, to:
        for a data load related to the entity, determine whether a first data loader associated with the root node for the data load requires action;
        when the first data loader requires action:
            identify a first dependency of the first data loader on a second data loader associated with another node of the hierarchical framework; and
            execute the second data loader and then execute the first data loader, whereby data is loaded to the data structure consistent with the data hierarchical framework;
        after execution of the application, which is associated with the data loaded to the data structure, determine whether the second data loader requires action to clean the data from the data structure; and
        when the second data loader requires action:
            identify a reverse dependency of the second data loader on the first data loader associated with the root node; and
            execute the first data loader and then the second data loader, thereby cleansing the data loaded, by the first data loader and the second data loader, from the data structure.

2. The system of claim 1, wherein the at least one computing device is further configured to identify a second dependency of the second data loader on a third data loader associated with a further node of the hierarchical framework; and
    execute the third data loader prior to executing the first data loader.

3. The system of claim 1, wherein the at least one computing device is further configured to identify a second dependency of the first data loader associated with the root node on a third data loader associated with a further node of the hierarchical framework; and
    execute the third data loader prior to executing the first data loader associated with the root node.

4. The system of claim 3, wherein the at least one computing device is configured to identify the first dependency by reading the first dependency of the first data loader associated with the root node on the second data loader from the first data loader.

5. The system of claim 3, wherein the at least one computing device is further configured to build a dependency graph for the data hierarchical framework, prior to determining whether the first data loader associated with the root node requires action; and
wherein the at least one computing device is configured to identify the first dependency from the dependency graph for the data hierarchical framework.

6. The system of claim 1, wherein each data loader includes one or more JAVA data loader objects.

7. A method of loading data in connection with testing an application, based on a hierarchical framework, the method comprising:
prior to execution of a test application, building, by a computing device, a dependency graph for multiple data loaders associated with the test application and based on the multiple data loaders;
determining, by the computing device, whether one of the multiple data loaders associated with the test application requires action;
determining, by the computing device, at least one dependency of the one of the multiple data loaders on at least one other one of the multiple data loaders requiring loading, based on the dependency graph, when the one of the multiple data loaders requires action;
executing the multiple data loaders, in an order defined by the at least one dependency, whereby data is loaded to a data structure for use by the test application;
after execution of the test application, determining, by the computing device, whether one of the multiple executed data loaders associated with the test application requires action to clean the data from the data structure;
determining, by the computing device, at least one reverse dependency of the one of the multiple executed data loaders on at least one other one of the multiple executed data loaders requiring cleanup, based on the dependency graph, when the one of the multiple executed data loaders requires action to clean the data structure; and
executing the multiple data loaders, as defined by the at least one reverse dependency, whereby data is cleaned from the data structure.

8. The method of claim 7, wherein the dependency graph includes multiple layers; and
wherein each data loader is associated with one of the multiple layers of the dependency graph.

9. The method of claim 7, wherein determining at least one dependency includes reading the dependency identifier in each of the data loaders.

10. The method of claim 9, further comprising determining, by the computing device, whether to bypass the data load, prior to determining whether one of the multiple data loaders associated with the application requires action.

11. The method of claim 10, wherein the multiple data loaders include multiple JAVA data loader objects.

12. A non-transitory computer-readable storage media including executable instructions for loading data associated with a data hierarchical framework having multiple layers, each layer having one or more nodes, and each node associated with a data loader, wherein the executable instructions, when executed by a computing device, cause the computing device to:
determine whether a root node data loader in a root layer of the data hierarchical framework requires action;
when the root node data loader requires action:
identify each dependency, in a second layer of the data hierarchical framework, of the root node data loader on each of one or more data loaders associated with one or more nodes included in the second layer;
identify each dependency, in a third layer of the data hierarchical framework, of the one or more data loaders associated with the one or more nodes in the second layer on each of one or more data loaders associated with one or more nodes included in the third layer; and
execute one or more of the data loaders based on the identified dependencies, whereby data is loaded to a data structure, in order, by the one or more data loaders associated with the one or more nodes in the third layer, then by the data loaders associated with the one or more nodes in the second layer, and then by the root node data loader; and then
after execution of a test application associated with the loaded data, determine whether the executed one or more data loaders requires action to clean the loaded data from the data structure; and
when the executed one or more data loaders requires action:
identify each reverse dependency, in the third layer of the data hierarchical framework, of the one or more data loaders associated with the one or more nodes included in the third layer on each of the one or more data loaders associated with the one or more nodes in the second layer;
identify each reverse dependency, in the second layer of the data hierarchical framework, of the one or more data loaders associated with the one or more nodes in the second layer on the root node data loader; and
execute one or more of the data loaders based on the identified reverse dependencies, whereby data is cleaned from the data structure.

13. The non-transitory computer-readable storage media of claim 12, wherein the executable instruction, when executed by the computing device, further cause the computing device to build a dependency graph for the data hierarchical framework, prior to determining the root node data loader requires action and to identify each dependency based on the dependency graph for the data hierarchical framework.

* * * * *